United States Patent [19]

Barham

[11] Patent Number: 5,795,065

[45] Date of Patent: Aug. 18, 1998

[54] TEMPERATURE-TIME-PRESSURE DETECTOR

[76] Inventor: William L. Barham, P.O. Box 863, Mount Airy, N.C. 27030

[21] Appl. No.: 792,649

[22] Filed: Jan. 31, 1997

[51] Int. Cl.[6] .................... G01K 11/06; G01K 3/04; G01K 13/00; G01L 7/10
[52] U.S. Cl. .................... 374/106; 374/160; 374/102; 374/142; 116/217; 116/220; 116/266; 368/11; 73/714; 73/731
[58] Field of Search .................... 374/106, 160, 374/104, 143, 142; 116/217, 219, 220, 266, 268; 422/59; 368/11; 73/709, 714, 731

[56] References Cited

U.S. PATENT DOCUMENTS

| | | | |
|---|---|---|---|
| 2,195,395 | 4/1940 | Chapman | 374/106 |
| 2,847,067 | 8/1958 | Brewer | 374/160 |
| 3,242,733 | 3/1966 | Johnson | 374/160 |
| 3,414,415 | 12/1968 | Broad, Jr. | 116/219 |
| 3,521,489 | 7/1970 | Finkelstein et al. | 374/106 |
| 4,038,873 | 8/1977 | Kimmel | 374/106 |
| 4,353,990 | 10/1982 | Manske et al. | 374/106 |
| 4,421,124 | 12/1983 | Marshall | 116/268 |
| 4,844,622 | 7/1989 | Weiss | 374/102 |
| 5,378,430 | 1/1995 | Nienes et al. | 374/106 |

FOREIGN PATENT DOCUMENTS

| | | | |
|---|---|---|---|
| 0625618 | 9/1981 | Switzerland | 374/160 |
| 0676882 | 7/1979 | U.S.S.R. | 374/160 |
| 0706300 | 3/1954 | United Kingdom | 374/102 |
| 2203244 | 10/1988 | United Kingdom | 374/160 |
| 2209396 | 5/1989 | United Kingdom | 116/217 |

Primary Examiner—Diego F. F. Gutierrez
Attorney, Agent, or Firm—William J. Daniel

[57] ABSTRACT

A temperature-time-pressure detecting device for a closed heat treatment zone consists of a sealed discoidal-shaped capsule of substantially transparent material adapted for placement within the zone in a generally vertical position. The capsule is formed of two opposed preferably symmetrical circular shell walls sealed around their common rim and defining therebetween a central core region containing a shaped mass of a fusible indicating material having a defined melting point at least as high as the temperature to be detected. The central core region is surrounded by an inner and an outer annular chamber which are concentric with the core region and with one another. Separating the inner chamber from the core region is a spacer ring maintaining the shell walls fixedly spaced apart, the ring being penetrated at preferably uniformly circumferentially spaced points by radial ports for the passage of fused indicating material at a rate such that migration of the fused material to the inner chamber occurs over a time interval generally corresponding to the time to be detected. For detecting a desired pressure, the shell walls of the inner chamber slope inwardly to converge into mutual contact to form a closure normally separating the inner from the outer chamber. Pressure of a selected magnitude applied to the capsule walls causes the central core walls to deflect inwardly resulting in the application of leverage, with the spaced ring as fulcrum, to the converging inner chamber walls to force the same apart to open the closure and allow fused material to pass into the outer chamber.

5 Claims, 4 Drawing Sheets

TEMPERATURE-TIME-PRESSURE DETECTOR

FIELD OF THE INVENTION

The invention relates to a detection or monitoring device and more particularly to an inexpensive capsule for providing a reliable visual indication in any of multiple orientations of the achievement in the environment ambient to the device of a temperature of a given magnitude sustained for a given time and preferably at a given pressure.

BACKGROUND OF THE INVENTION

For certain purposes, it becomes necessary to provide a heated environment maintained with assurance at at least a specified temperature for a duration of at least a specified time. As one example, various medical specialists, in particular, surgeons, dental surgeons and the like, utilize in the performance of their professional duties various instruments that necessarily come into contact with the tissue and/or bodily fluids of patients who may possibly be suffering from any of a variety of diseases that may be entirely unrecognized. Economic and environmental considerations argue against the disposal as waste of these instruments. They are usually expensive due to their specialized nature and strict environmental regulations controlling disposal are in force and must be observed. The only effective alternative is sterilization.

Thus, medical instruments are routinely subjected to sterilization in autoclaves, steam chests, or similar heating vessels. For the protection of both patients and medical personnel, particularly since the recognition of the HIV epidemic and its usual consequence AIDS, strict governmental regulations have been imposed to ensure the achievement of effective sterilization conditions within the sterilization unit.

Sterilization is defined in Dorland's Illustrated Medical Dictionary, 24th Edition, Copyright 1965, as "The complete destruction of microorganisms by heat (wet steam under pressure at 120° C. for 15 minutes, or dry heat at 360°–380° C. for 3 hours) or by bactericidal chemical compounds." Different values may be specified by local authorities; for instance, in North Carolina, heating must be with dry heat at a temperature of 340° F. (171.1 C.) for 60 minutes or with pressurized steam at 270° F. (132.2° C.) at 30 psi (gauge) for 10 minutes. While specific levels may vary, exposure to heat of some mandated degree for some mandated period of time, and optionally to some mandated vapor pressure, is a prerequisite for sterilization of re-usable medical devices.

It should be noted that the temperature conditions may vary from one region of the autoclave or steam chest to another. Hence, the mere external observation of operation of the sterilization apparatus over a given time interval does not necessarily mean that a particular part, or even any part, of the apparatus has actually been maintained at its nominal operating temperature over the entirety of that period of time.

Therefore, there must be an actual determination that the mandated conditions adequate for sterilization, i. e. temperature and duration, are in fact achieved within the sterilization unit. One typical technique employed for such determination is the placement in the sterilization unit along with the articles to be sterilized of at least one sealed capsule containing viable spores of a certain approved variety. At the end of the heat treatment, these capsules are removed and sent to an approved laboratory. The capsules are observed by the laboratory under conditions at which the spores would germinate if viable and if no germination occurs, the applicable sterilization conditions are deemed medically sufficient.

Obviously, the spore destruction technique for demonstrating adequate sterilization conditions is time-consuming, since a sufficiently lengthy period of germination must be maintained, and expensive, requiring the services of a testing laboratory.

There are also available dye-impregnated test papers that undergo a color change upon heating to a certain temperature range. However, these papers cannot give a reliable indication of the achievement of a particular temperature and certainly not of a particular duration of heating at such temperature.

In addition, suggestions appear in the prior art of devices for detecting the achievement of sterilization or other heat treatment conditions by means of a visual response within the device. Typically, a sealed vessel is provided which contains in one region thereof a material adapted to change from a solid to a liquid state, e. g. melt or fuse, at a given temperature and migrate while in the liquid state to a different region. The change in state gives an indication that a given temperature corresponding to the melting point of the material has been reached while the change in location gives an indication of a time interval dependent upon the melt viscosity of the material and the distance separating the starting and final regions of the vessel.

Heat detection devices of the latter kind have certain disadvantages. They tend to be unidirectional in function, i. e. the device must be oriented in a particular way, e. g. along a particular axis, since the migrational flow is caused by gravity. If the device should be incorrectly oriented in the sterilization unit or should undergo a change in orientation during sterilization, it loses its effectiveness.

More important, the prior art devices are not designed to provide any indication of the maintenance of any given vapor pressure within the interior of the sterilization unit. Hence, their monitoring function does not extend to pressurized units. There is accordingly a need in this art for a detector capable of indicating the creation within the vessel of a certain pressure in addition to the achievement therein of a certain temperature sustained for a certain time interval.

OBJECTS OF THE INVENTION

The basic object of the present invention is a simple inexpensive monitoring device or detector of technically assured reliability for demonstrating the achievement within a heat treatment vessel of a temperature of sufficient magnitude for a time duration of a certain length, which device is omni-directional in its action and is thus not dependent of a particular orientation for its operation.

A further preferred object of the invention is a heat detector that is capable of indicating the attainment of a given pressure in the surrounding environment in addition to the attainment therein of a given temperature sustained for a given period of time.

Another object is a small capsule-like container capable of placement within a heat treatment zone for providing a reliable indication to even an unskilled technician that a certain predetermined temperature has been achieved within that zone for a certain predetermined time and under a certain predetermined pressure consistent with the requirements of a selected heat treatment, e. g. sterilization.

A still further object of the invention is a temperature-time, and preferably pressure, heat detector that will fit handily within a heat treatment zone, e. g. autoclave or like sterilization chamber, with a minimum loss of useful space.

BRIEF DESCRIPTION OF THE DRAWINGS

An illustrative embodiment of a temperature-time-pressure heat detector according to the invention is shown in somewhat enlarged fashion in the accompanying drawings in which.

DETAILED DESCRIPTION OF ILLUSTRATIVE EMBODIMENT OF THE INVENTION

The heat detector of the invention preferably takes the form of a generally circular shallow hollow or discoid capsule-like container. The walls of the capsular container are formed of a structural material that is optically transparent so that any contents are visible to the eye or its equivalent, e. g. a light detecting or monitoring system utilizing a photoelectric cell or the like, and is inert and structurally stable when exposed to heat of at least the intensity of the heat treatment to be detected. The construction material should, moreover, be sufficiently stiff that it retains its shape but is at least modestly resiliently flexible to permit bending of perhaps 10°–20°. Heat-resistant clear plastic, such as a polycarbonate or the like, is one possible choice and others will be obvious to one knowledgeable in the plastics field. While the plastic can conceivably be shaped into the desired configuration in other ways, preferably, the capsule is assembled from heat-resistant plastic sections molded from sheet material to the necessary configuration.

The capsular container includes a central core region 10 serving to hold a body or mass (shown with stippling), preferably of at least roughly spherical shape although other shapes are certainly feasible, of a fusible indicator material F which is solid at normal or room temperature but has a melting or fusion point generally corresponding to the temperature to be detected. To ensure easy visualization of the fusible material F even in fairly thin streams, it is preferably colored, as suggested by the stippling, by the addition thereto of a distinctly visible dye or other dark colorant, unless of course the fusible material is naturally of prominent color and remains colored when molten.

To impart to the central core region 10 an interior volume adequate to contain the body of indicator material F of reasonable size, that region is of greater transverse thickness than the remainder of the capsule and is preferably enclosed by walls of domed or outwardly concave shape. The capsule is advantageously assembled from two opposed generally symmetrical shells 12, 12' that are affixed together, e. g. by ultrasonic fusion or "welding" and the like, in air-tight fashion around their extreme perimetal margin or outer rim 14. The respective shells are molded or otherwise shaped to the required configuration and as a part of this shaping, a domed curvature can be imparted to the central area to create the domed contour preferred for the central region 10. While both of the shells 12, 12' are preferably of domed curvature and symmetrical to simplify manufacture, this is not essential. If desired, only one can be curved in its central region and the other flat or planar, provided of course sufficient internal space is created for the central core to contain a body of fusible material F large enough for easy visualization.

Similarly, the transverse thickness of central region 10 can be varied subject to the same proviso. To maintain the shells in proper spaced apart relation and to define the outer boundary of the central core region, a rigid spacer ring 16 is interposed between the shells with its end faces abutting interior surfaces of the shell regions and affixed thereto. Ring 16 is preferably circular concentric with the center axis of the detector and has a diameter corresponding to the radially outer limits of the central core region thereof to thereby define those limits.

Around the central core region radially outward of spacer ring 16 and in concentric relation thereto is a first, or inner, annular zone or chamber 20 that is intended to receive from the central core region molten fusible indicator material F when the latter migrates generally radially from the core region upon being exposed to a temperature above its melting point. The loss due to melting of the initial shape, e. g. spherical, of the indicator material F and, in particular, the visible presence in the interior annular region 20 of the indicator material F thus denotes the attainment in the environment surrounding the detector of the desired elevated temperature.

In order for communication to exist between the central core region and the inner annular chamber, spaced ring 16 is interrupted or perforated by a series of narrow passages or ports 18. These ports 18 serve to control or regulate the rate of flow of the molten indicator material F from the central core region 10 to the first annular chamber 20 so that the migration of the material F between these regions desirably takes place over an extended time period at least consistent more or less with the required duration of the heat treatment. Ports 18 are spaced apart around the perimeter of the central core region at convenient intervals and, assuming rings 18 to be circular, as is ordinarily the case, are located at essentially the same radial distance from the central axis of the core region. The number of such ports, and hence the extent of the spacing or interval therebetween, is not critical provided the number is large enough to achieve the desired multi-directional (omni-directional) indicating function.

To amplify as to this function, the purpose of ports 18 is to convey in controlled fashion fused indicator material from the central core region to an area of the first annular chamber that is in roughly vertically alignment with the axis of the core region when the detector as a whole is supported with its plane in substantially upright condition within the heat treatment zone (e. g. autoclave). To insure that this function will take place when the detector is oriented in a considerable number of angular positions along the 360° around its axis, the number of ports is sufficient as to provide a port is operative more or less aligned relation for a multiplicity of such positions.

Figure 3:
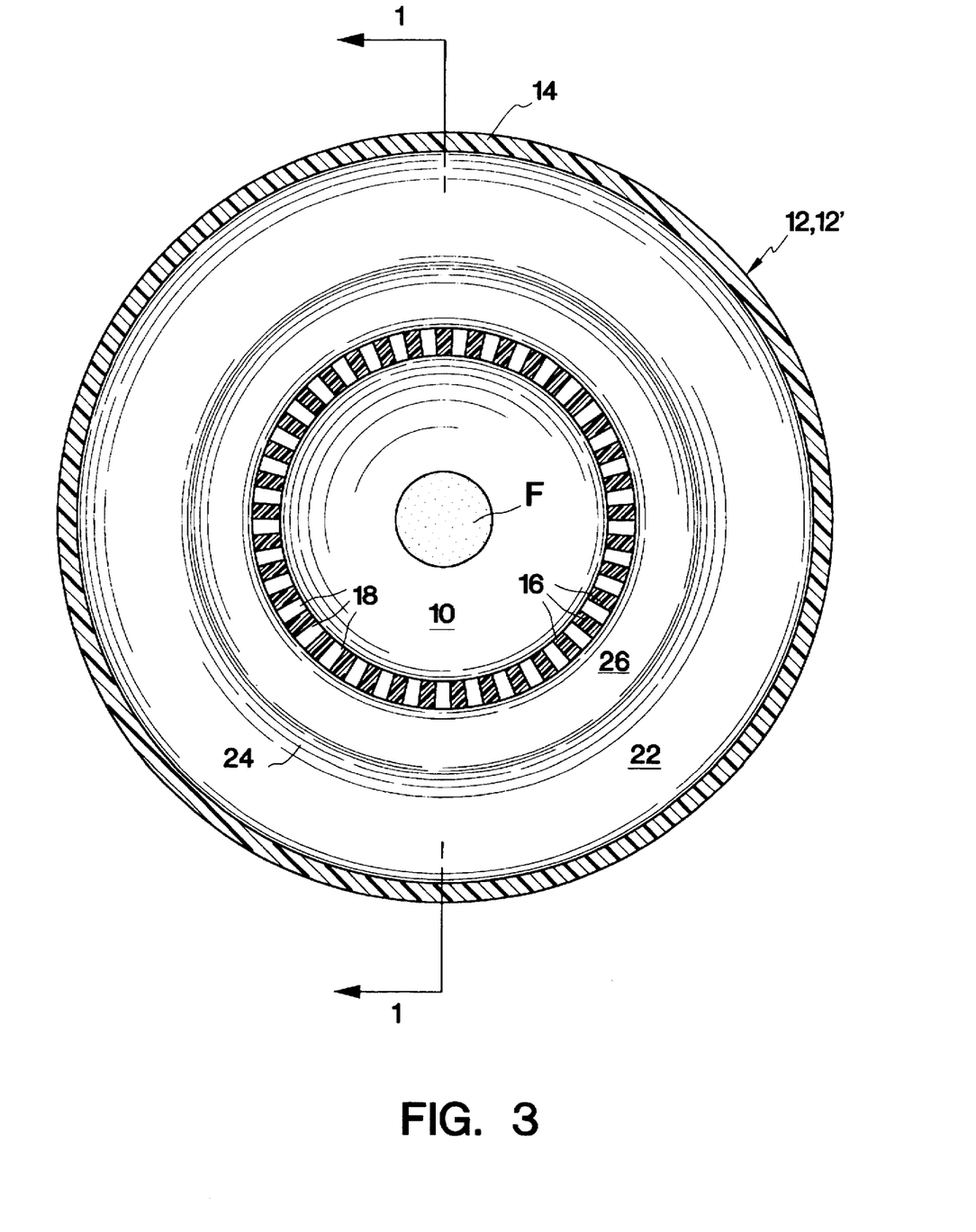
FIG. 3 is a front cross-sectional view on a slightly enlarged scale of the detector of FIG. 1 of the invention, taken through its central plane, the detector also being shown in its starting condition.

It will be understood that it is not essential for the orientation of the detector in the heat treatment zone to be so carefully selected that one of ports 18 is situated precisely vertically beneath the central axis of the detector. This would require a very large number of ports to insure that a port is provided for each possible rotational orientation of the detector and unnecessarily complicate manufacture. Rather, molten indicator material will collect in a slight pool along the lower arc of the spacer ring and readily find and pass through a slightly displaced port. It is enough then that the ports be separated by perhaps 5°–15°, around the core axis, dependent on the size of the detector, especially the circular size of spacer ring. For larger detectors, the extent of separation should be reduced and vice versa. A fairly close spacing, as suggested in FIG. 3, is usually preferred but not a necessity. The angular spacing of the ports is preferably uniform.

The time interval for molten indicator material to move from the central core region 10 to the first annular chamber through one or more of the ports 18 is determined by the melt viscosity of a particular molten indicator material at the selected temperature and the cross-sectional area or composite area of the port or ports and that area is selected with this function in mind in the light of the amount of fusible indicator material that is provided in the core region.

Disposed in radially outward relation to the first annular chamber 20, i. e. on the opposite side of spacer ring 16 from first chamber 20, is a second, or outer, annular chamber 22. Annular portions of the opposite shell walls 12, 12' forming the side walls of the first annular chamber slope inwardly at a small angle in mutually converging relation to the radially outer limit of the inner chamber and then at the inner limit of the second annular chamber slope outwardly at a similar small angle in mutually diverging relation to create an annular constriction or neck 24 between the two chambers.

The transition from convergence to divergence for each of the opposite shell walls intermediate the two chambers thus constitutes a locus of inflexion which is circular concentric to the detector axis and these circular inflexion loci for the two shells are radially coincident. The convergent angle of inclination and the radial extent of the convergence, i. e. the radial dimension of first chamber 20, is such that the opposite inflexion loci of the respective shells are in mutual contact when the detector is in its normal or "relaxed" state and thus isolate the two annular chambers from one another.

Figures 1, 2:
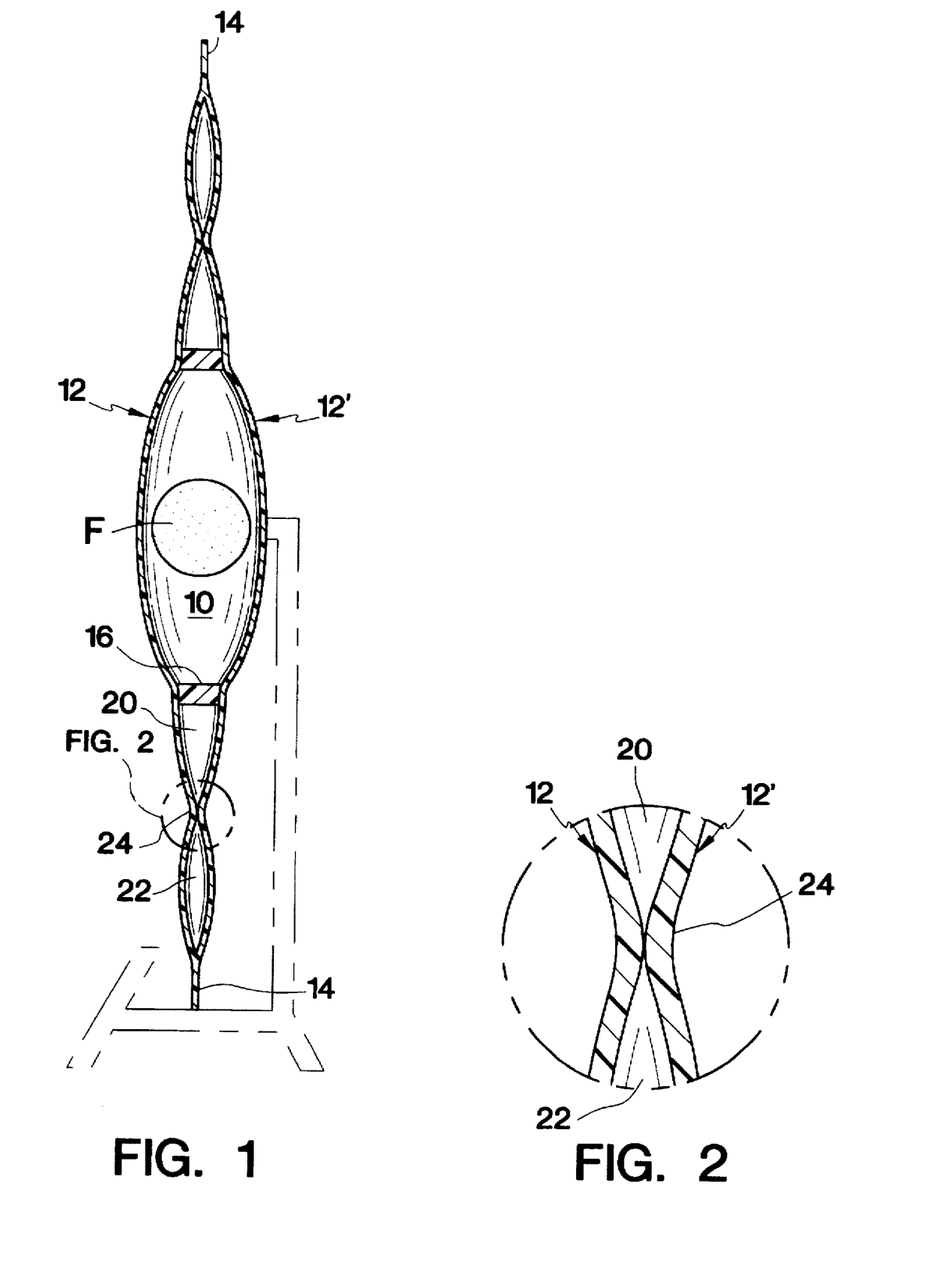
FIGS. 1 is a cross-sectional side view transverse to a central plane of the illustrative capsular heat detector of the invention taken generally along line 1—1 of FIG. 3, the detector in this view being in its initial or starting condition before being exposed to heat, an optional stand for supporting the detector in an upright position being indicated in broken lines.
FIG. 2 is a greatly enlarged detail view of the region of the detector of FIG. 1 enclosed within a broken line circle, which region incorporates a "pressure-responsive closure" adapted upon exposure to pressure of a certain minimum level to produce a visually evident change within the detector and thereby visually demonstrate the increased pressure, the "closure" being seen in its closed position in this view.

In other words, annular portions of the respective shell walls forming the inner chamber 20 and an adjacent portion of the outer chamber 22 are deformed toward one another in pinching fashion to create neck 24 between the two chambers. This neck is sufficiently constrained in the normal state or unstressed state of the detector that its opposite sides meet or make contact to close off the outer chamber from the inner and prevent passage of molten indicator material F from the inner chamber to the outer chamber. The closed condition of neck 24 is shown in FIG. 1 and in detail in FIG. 3.

In accordance with the preferred embodiment of the invention, application to the detector of pressure of a certain magnitude, e. g. steam vapor pressure created within a sealed autoclave, causes the opposed circular loci of inflexion constituting neck 24 to be displaced laterally, i. e. generally parallel to the detector axis, from their normal contacting condition to thereby open neck 24. Opening of the neck of course brings the outer chamber into communication with the inner chamber. Any molten indicator material F which has accumulated in a lower side of the inner chamber 20 is now able to flow through neck 24 into the outer chamber. Presence of molten indicator material in the outer chamber thus demonstrates to an observer the attainment within the heat treatment zone being monitored by the detector of the selected pressure.

Figure 4:
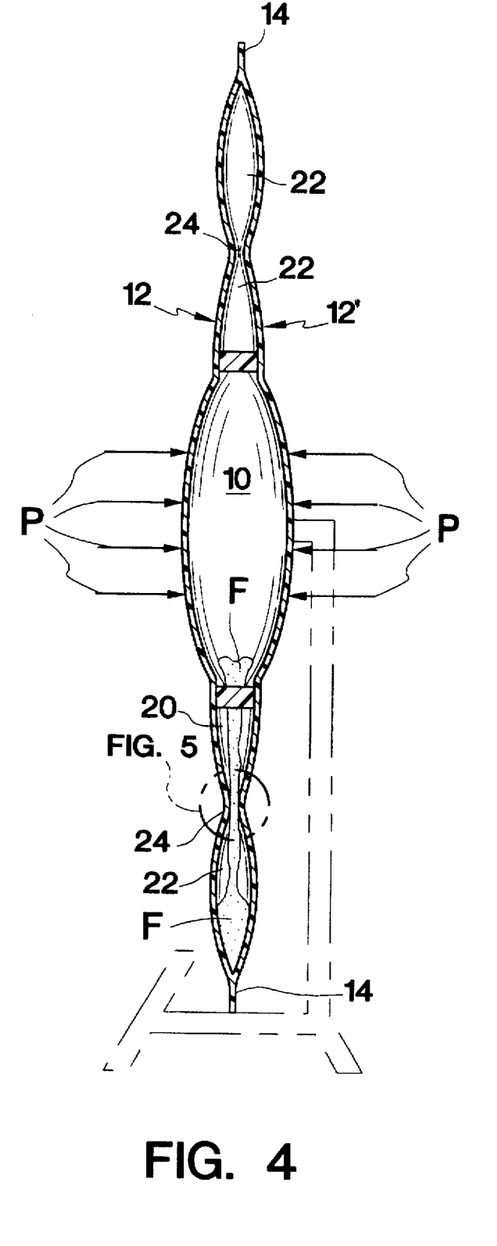
FIG. 4 is a side cross-sectional view similar to FIG. 1, taken along line 4—4 of FIG. 6, showing the detector capsule in its final condition at the end of a heat treatment, i. e. after passage of the full duration of the heat treatment, and after the application thereto of an exterior pressure of sufficient magnitude, indicated by arrows directed toward its mid-section.

It is intended that when the detector is exposed to elevated pressure, denoted by the arrows P present in FIG. 4, the application of such pressure to the shell walls 12, 12' will cause the domed regions of such walls enclosing the central core to be deformed or squeezed inwardly toward one another, as indicated in FIG. 4. The spacer ring 16, interposed between the opposite shell walls along the common boundary between the central core and first annular chamber 20, acts as a fulcrum for the shell walls so that inner flexure of the domed wall sections interior of the fulcrum ring results in outer (lateral) flexure of the inclined chamber wall sections exterior of the fulcrum ring with consequential separation of the loci of inflexion of neck 24 to open the neck.

Obviously, to effectively serve as a fulcrum, ring 18 must be sufficiently rigid in a direction parallel to the central axis of the detector than it retains its thickness in that direction and withstands lateral pressure bearing against the shell walls. To this end, the radial thickness of ring 18 can be a large as needed to impart the desired rigidity.

Figure 5:
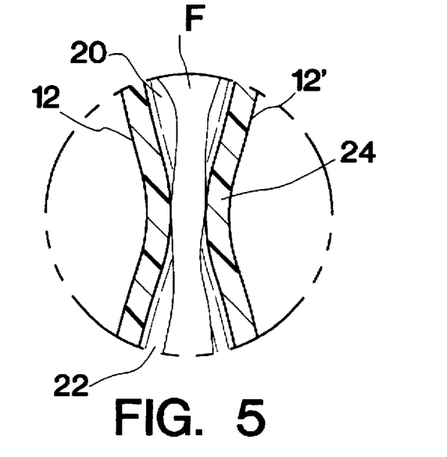
FIG. 5 is a greatly enlarged detail view of the circular region defined in broken lines of FIG. 4, similar to FIG. 2 but showing the "pressure-activated closure" thereof in open position to allow fused indicator material to flow therethrough into a peripheral region of the detector and thereby give a visual demonstration of the exposure of the detector to the selected exterior pressure.
Figure 6:
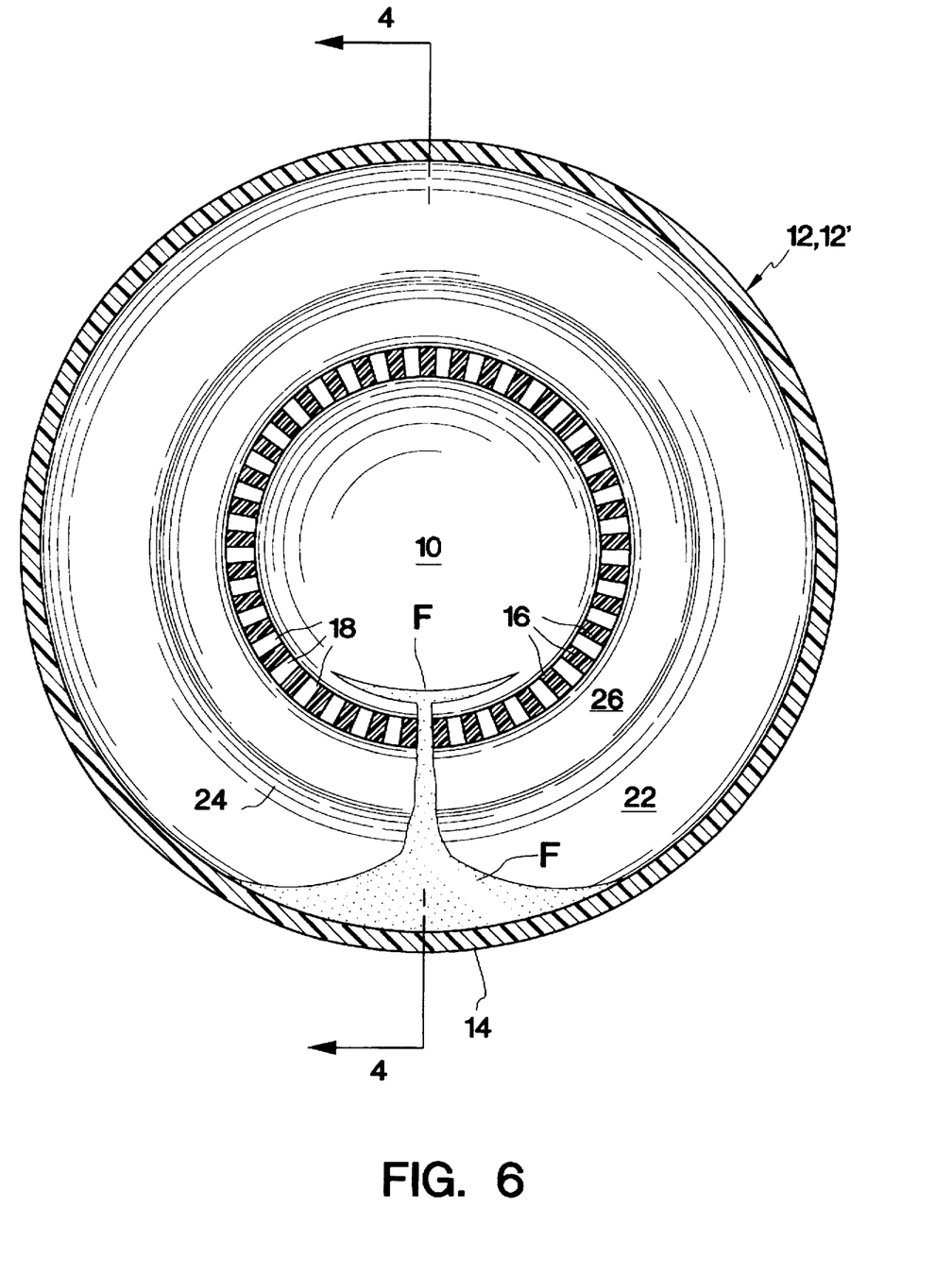
FIG. 6 is a front cross-sectional view similar to FIG. 4 but showing the detector after heating and pressurization with the "closure" open to permit molten indicator material to flow therethrough, as shown.

FIGS. 4 and 6 show the detector in a pressure-indicating mode, viewed in cross-section and from the front side, respectively, with the neck 24 in an open state, seen in enlarged detail in FIG. 5, with the molten indicator material passing therethrough and beginning to collect in the outer annular chamber. The condition of the molten indicator material seen in FIGS. 4 and 6 is somewhat idealized in order to clearly convey the operating sequence of the detector. In practice, the downward path of the molten material would tend to be more random and would be likely to spread over a small arc of the inner face of spacer ring 16, penetrating more than one of the ports 18, rather than passing in a "neat" coherent stream through a single port alone.

The shell walls in the radially outer one-half of the outer annular chamber 22 finally slope convergingly inwardly until they come into lateral abutment at their rim and are joined together at 14 as already stated.

To insure the desired response of the detector upon exposure to elevated pressure, it may be advantageous for the interior of the detector after its assembly to be evacuated to at least lower the pressure therein significantly below atmospheric and thereby lessen the force needed to be applied to the domed shell wall sections to cause their inward deflection. The stiffness of the shell walls as such must be sufficient to insure the creation of a lever action around the fulcrum ring 16 so that laterally inward deflection of the domed wall sections inside of the fulcrum causes laterally outward deflection of the outer margins of inner annular chamber 20 outside the fulcrum to open neck 24. In need be, radially extending ribs (not shown) can be added to the exterior or interior surfaces of the shells walls across the central core region and inner annular chamber, but stopping short of the loci of inflexion, to increase wall stiffness in these regions.

As a fusible indicator material F, there may be employed any crystalline chemical compound, either inorganic or organic, that is substantially chemically stable to heat in the vicinity of the temperature to be detected, which has a crystalline melting point at least as high as the temperature to be detected and is visible in either its solid or molten states either directly or with the aid of a compatible colorant.

Given that the crystalline melting point of a given crystalline material is a very precise physical characteristic of that material when of high purity (i. e. of at least 98% purity), varying only over a few degrees of temperature and more usually quite exact, a change in state from solid to molten condition of a given material upon heating gives a quite reliable indication that a temperature equal to the crystalline melting point in question has been reached within the treatment zone.

In most instances, it is preferred that the crystalline melting point of the indicator material be somewhat higher, i. e. by at least a few degrees or even more, than the temperature to be detected. This provides a margin of safety by guaranteeing that the desired temperature has been consistently reached. There may be special circumstances where an exact temperature is required to be detected and in such a case, there must be a more precise match between the crystalline melting point of the material and the temperature but this will not usually be true.

On order for the molten material to flow properly within the detector and be uniform over time, it is necessary that the molten material have the property of wetting the surface of the shells walls. The existence of a wetting relationship can be confirmed by the presence of a positive meniscus at the surface of the molten material. That is, the surface of the molten material at its intersection with the detector wall will show a slight upward and outward (positive) curvature or to describe the phenomenon in other terms, regions of the molten surface spaced from the wall surface will be slightly depressed below its peripheral margin directly proximate the wall surface.

Given a wetting relationship between the crystalline material in a fused state and the surface of the shell walls, for a given material two factors mainly control the time interval needed for the displacement of the fused material within the detector, namely, the quantity or mass of the indicator material provided in the central core region and the cross-sectional area of the ports in the spacer ring through which the fused material must pass in moving from the central core region to first annular chamber.

By varying these factors, the time interval to be detected can be controlled as required for the particular heat treatment. The viscous flow rate of the molten crystalline material may also be influenced somewhat by the level of the temperature to be detected but this change will usually be less than the above two factors.

The detection devices of the invention can easily be "calibrated" for a particular combination of temperature and time conditions and for a particular indicator material F by a series of simple experiments observing the length of time for a given amount of a given material to pass through ports of a given cross-sectional area and given angular spacing when subjected to a controlled temperature of the contemplated magnitude. For ports of a certain area, the length of time for movement of the molten material therethrough will vary generally roughly linearly with the mass of the molten material to be moved, except for relatively small passageways where surface friction effects become significant. Thus, an increase or decrease in the mass or volume of indicator material within the central core region will obviously result in a more or less corresponding increase or decrease in the time for the material to transfer fully to the inner annular chamber. To achieve a time greater than that afforded by available capacity, further tests will be necessary with one or more different detectors of modified construction to increase capacity and/or change in effective port area.

Similarly, calibration of the response of the detector to a specific pressure can be made by routine experimental testing over a range of vacuum levels within the interior of the detector as well as with different detectors constructed from shell walls of different degrees of stiffness.

It hardly needs to be mentioned that the displacement of the molten material within the detector from the central core to the first and second annular chambers must be visually evident or discernable. If the indicator material should be water-white or clear in its aspect in both its solid and fused states, movement of the same within the detector would be difficult to perceive. Even in this case, observation under reflected light at several angles should enable an observer to confirm the displacement of the material. A more convenient and reliable solution would be to add an inert colorant to impart a tint to the material to enhance its visibility to even a casual observer. The colorant should dissolve in or at least be stably dispersed through the indicator material when both molten or solid so that it does not form a separate phase in either state. By "inert" is meant that the colorant is compatible with the indicator and does not react with the it in such as way as to significantly alter its behavior for purposes of the invention.

Only small amounts of any colorant should be sufficient and any effects on the indicator material should be minor and can in any case be determined by a "calibration" of a particular combination, as described above. Suitable colorants can be identified from among the known food dyes, for example. Such dyes, being approved for human consumption at the intended concentrations, would be reasonably safe even if the detector should accidentally rupture during use.

The choice of a particular indicator material begins with the specific temperature of the heat treatment to be monitored. For medical sterilization, as defined above, one suitable material is normal or ordinary tartaric acid (either D- or L-tartaric acid, i. e. 2, 3-dihydroxybutanedioic acid, both of which, according to Merck's Index, 10th Edition, 1983, form prismatic crystals with a melting point of 168–170 C. (ca. 338 F.), as distinguished from DL- and meso-tartaric acid which have different melting points. A related compound is anhydrous citric acid, i. e. 3-hydroxy-1, 2, 3-propanetri-carboxlylic acid (as distinguished from the monohydrate form that softens before melting), that forms monoclinic crystals with an m. p. of 153 C. (307 F.). All of these materials are quite non-toxic and pose no hazard in their use. They readily wet glass surfaces and flow smoothly when molten.

For the pressurized steam heating mode calling for a temperature of about 132° C., a useful compound is reagent grade urea of 99.92% purity and a melting point of 132.7° C. Ammonium nitrate has been found to be an acceptable alternative for this temperature although theoretically according to Merck's Index, this compound decomposes at 210° C. Both are crystalline when solid and wet glass surfaces and are easily available at low cost.

Dibasic acids of the oxalic acid series at least up to about $C_{10}$ possess the requisite properties, all being crystalline when solid and hydrophilic when molten and range in melting point from 98 to about 190 C. according to the number of carbon atoms therein. Most are free of toxicity problems although oxalic acid itself requires caution in handling.

Thermoplastic polymers having a reasonably narrowly-defined melting point are also candidates for the indicating material F and may even be preferable due to a more viscous molten condition affording a wider latitude in the selection of the duration of the time interval.

In the event a desired indicator material is hydrophobic in nature when molten, the shell walls can be coated on their internal surfaces with a hydrophobic coating such as a silicone resin to achieve the necessary wetting relationship between the molten material and the shell walls.

As has been implied in the preceding description. The construction of the invention while designed to enable the detection of a given vapor pressure within the heat treatment environment, can be utilized for the detection of the creation within that environment of a given temperature sustained for a given time interval without regard for pressure. For the latter purpose, the outer annular chamber plays no role, the neck 14 separating the outer from the inner annular chamber remaining closed, and the molten indicating material simply collecting in the inner chamber.

In use, the detector of the invention is placed within the heating environment, e. g. autoclave, an upright position as shown in FIG. 1. The detector can be propped in this position against any convenient surface within the environment but for more consistent performance, it may be desirable to provide a simple stand or support for the detector in this position, as is shown in FIG. 1 in broken lines. The heating unit is then closed and the heat treatment started. During the heat treatment and after the melting point temperature has been reached within the unit, the now molten indicator material flows down under the influence of gravity and gradually begins to flow through the ports of the spacer ring into underlying areas of the inner annular chamber. After lapse of sufficient time equal to at least the time interval to be measured, enough, e. g. substantially all, of the molten material passes through the port and collects in the inner annular chamber, thereby indicating the exposure of the detector to a given temperature for a given time period.

When exposure of the detector to a given pressure within the heat treatment zone is also to be detected, elevation of the pressure within the zone to the level of the predetermined pressure causes the opposite shell walls in the domed central core region of the detector to be deflected inwardly with a consequential outward deflection of the opposite shell walls in the vicinity of neck 24, resulting in opening of that neck. Molten indicator material that has begun to collect in the inner annular chamber is now free to flow under the continued force of gravity through open neck 24 into the outer annular chamber and collect in the underlying area thereof.

The actual dimensions of detectors according to the invention can vary as desired but a diameter of say about 1.5–2 cm or perhaps larger and a thickness of about 1 cm is convenient. Of course, larger or smaller units could be constructed if preferred. The illustrated embodiments are not intended to be re-used but to be discarded after use. To that end, they are adapted to be assembled at very low cost.

While the invention has been described especially with a view to medical sterilization for which it is ideally suited, one skilled in the art will understand that its scope is in principle not restricted to this one field but extends to any field in which a change in temperature above a predetermined level for a predetermined time is important, e. g. thawing above a certain freezing point. Similarly, the identification of particular indicator materials is intended only to be representative or illustrative of the broad range of such materials to which resort can be had in the practice of the invention. Consequently, the scope of the invention should limited only as necessitated by the language of the appended claims.

I claim:

1. A temperature-time detecting device for a closed zone comprising a sealed discoidal-shaped capsule of transparent material adapted for vertical orientation within the zone, said capsule being formed of two opposed circular shell walls sealed around a common rim and having portions defining therebetween a central core region and an annular chamber surrounding said central core region and concentric therewith, said core region containing a mass of a distinctly visible fusible indicating material having a substantially defined melting point at least as high as a temperature to be detected and being separated from said annular chamber by a spacer ring, said spacer ring holding the shell walls spaced apart and being penetrated at generally uniformly circumferentially spaced points by radial ports for passage of fused indicating material at a rate such that substantially complete migration of the fused material from said central core region to the annular chamber occurs over a time interval generally corresponding to the time to be detected.

2. The detecting device of claim 1 wherein said fusible indicating material is a crystalline substance having a defined crystalline melting point and is colored by an inert dye which is compatible with said indicating material when in a fused state.

3. A device for detecting exposure of a closed zone to a selected time, temperature and pressure which comprises a sealed discoidal-shaped capsule of transparent material adapted for vertical orientation within the zone, said capsule being formed of two opposed circular shell walls sealed around a common rim and having portions defining therebetween a central core region and a first annular chamber surrounding said central core region and concentric therewith, said core region containing a mass of a distinctly visible fusible indicating material having a substantially defined melting point at least as high as a temperature to be detected and being separated from said annular chamber by a rigid spacer ring holding said shell walls fixedly spaced apart, said spacer ring being penetrated at generally uniformly circumferentially spaced points therearound by radial ports for passage therethrough of fused indicating material at a rate such that substantially complete migration of the fused material from said central core region to the first annular chamber occurs over a time interval generally corresponding to the time to be detected, and said shell walls have further portions defining a second annular chamber disposed radially outwardly of the first annular chamber and concentric therewith, and at least one of the wall portions of said first chamber slopes toward the other wall portion thereof to bring such wall portions into mutual contact along a circular locus spaced radially outwardly from said spacer ring and thereby form a closure normally separating the first annular chamber from the second annular chamber, so that application to the capsule walls of a selected pressure causes a central core portion of at least the wall having the sloping portion to deform toward the opposite wall portion resulting in the application of leverage, with the spaced ring as fulcrum, to the corresponding sloping wall portion of said first chamber to displace the same out of contact with the opposite wall portion at said circular locus to open the closure and place the chambers in communication and allow fused material to pass into the second chamber and thereby indicate exposure of the device to the selected pressure.

4. The detecting device of claim 3 wherein the interior of said capsule is evacuated to reduce the pressure therein and adjust the magnitude of said pressure to be detected.

5. The detecting device of claim 3 wherein the central wall portion of at least the shell wall having the sloping portion is convexly curved outwardly.

\* \* \* \* \*